US008627128B2

(12) United States Patent
Bieswanger et al.

(10) Patent No.: US 8,627,128 B2
(45) Date of Patent: Jan. 7, 2014

(54) POWER MANAGEMENT FOR PROCESSING CAPACITY UPGRADE ON DEMAND

(75) Inventors: Andreas Bieswanger, Ehningen (DE); Andrew J. Geissler, Pflugerville, TX (US); Hye-Young McCreary, Liberty Hill, TX (US); Freeman L. Rawson, Austin, TX (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 12/942,475

(22) Filed: Nov. 9, 2010

(65) Prior Publication Data

US 2012/0117403 A1 May 10, 2012

(51) Int. Cl.
*G06F 1/00* (2006.01)

(52) U.S. Cl.
USPC ............................ 713/322; 713/300; 713/323

(58) Field of Classification Search
None
See application file for complete search history.

(56) References Cited

U.S. PATENT DOCUMENTS

| 5,483,656 | A | 1/1996 | Oprescu et al. |
| 7,275,164 | B2 | 9/2007 | Hottelet et al. |
| 7,389,435 | B2 | 6/2008 | Barr et al. |
| 7,702,931 | B2 | 4/2010 | Goodrum et al. |
| 2005/0050373 | A1* | 3/2005 | Orenstien et al. ............. 713/320 |
| 2007/0028129 | A1 | 2/2007 | Schumacher et al. |
| 2008/0072079 | A1* | 3/2008 | Bieswanger et al. ......... 713/300 |
| 2008/0082844 | A1* | 4/2008 | Ghiasi et al. ................. 713/323 |
| 2009/0328055 | A1* | 12/2009 | Bose et al. ................... 718/105 |
| 2010/0037038 | A1 | 2/2010 | Bieswanger et al. |

OTHER PUBLICATIONS

Carstens, Auto-adaptive memory speed to voltage scaling, IP.com, http://www.ip.com/pubview/IPCOM000133183D.*
"Method to improve utilization of test system time", IBM, Nov. 14, 2008, IPCOM000176532D, pp. 1-3.

* cited by examiner

*Primary Examiner* — Paul Yanchus, III
*Assistant Examiner* — Vincent Chang
(74) *Attorney, Agent, or Firm* — Yee & Associates, P.C.; David A. Mims, Jr.

(57) ABSTRACT

A method, computer program product, and apparatus for managing power in a data processing system are presented. A core is activated in the data processing system and configured to operate at a frequency in response to receiving a request to increase a processing capacity of a set of resources in the data processing system. A determination whether a use of power resulting from activating the core configured to operate at the frequency meets a policy for the use of the power in the data processing system is made. A set of parameters associated with devices in the set of resources are adjusted to meet the policy for the use of power in the data processing system in response to a determination that the use of power does not meet the policy. A determination whether a number of operations performed per unit of time by a set of cores associated with the set of resources increased after activating the core is made. An indication that the request to increase the processing capacity of the set of resources is unavailable is made in response to a determination that the number of operations performed per unit of time by the set of cores associated with the set of resources has not increased.

25 Claims, 11 Drawing Sheets

POWER MANAGEMENT FOR PROCESSING CAPACITY UPGRADE ON DEMAND

BACKGROUND

1. Field

The present disclosure relates to managing power and in particular to managing power use in a data processing system. Still more particularly, the present disclosure relates to a method and apparatus for managing power use while increasing a processing capacity of a data processing system upon demand.

2. Description of the Related Art

Operations in a data processing system are performed using a processing unit. The operations performed may include, for example without limitations fetch, decode, execute, and write-back. The number of operations performed by the cores in the processing unit over a period of time can be referred to as processing capacity. The demand for processing capacity in a data processing system can vary over time. For example, a data processing system may experience higher demand for processing capacity on weekdays rather than on weekends. In another example, as a business grows the business may have an increased demand for processing capacity.

In certain situations, the frequency of the cores in the processing unit can be increased to increase processing capacity. A core is the part of the processor unit that performs the operations. The frequency of a processing unit is the number of clock cycles of the processing unit per second. A clock cycle is a period of time that a core in the processor unit takes to perform one operation. Thus, the cores in the processing unit may perform more operations per second when the frequency of the processing unit is increased.

In other examples, processing capacity may be increased with the use of additional cores in a processing unit. Often times, processing units include more than one core. For example, a processing unit having more than one core may be able to perform more than one operation at the same time.

However, increasing the frequency of the processor unit may result in an increase in an amount of power used by the processor unit. Additionally, adding cores may result in an increase in the amount of power used in the data processing system. When the use of power in the data processing system increases, the heat produced in the data processing system increases. The production of heat may cause the temperature of the devices in the data processing system to increase. When devices in the data processing system reach a certain temperature, the data processing system may not perform properly.

Accordingly, it would be advantageous to have a method and apparatus which takes into account one or more of the issues discussed above as well as possibly other issues.

SUMMARY

The different illustrative embodiments provide a method, computer program product, and apparatus for managing power in a data processing system. In an illustrative embodiment, a core is activated in the data processing system and configured to operate at a frequency in response to receiving a request to increase a processing capacity of a set of resources in the data processing system. A determination whether a use of power resulting from activating the core configured to operate at the frequency meets a policy for the use of the power in the data processing system is made. A set of parameters associated with devices in the set of resources are adjusted to meet the policy for the use of power in the data processing system in response to a determination that the use of power does not meet the policy. A determination whether a number of operations performed per unit of time by a set of cores associated with the set of resources increased after activating the core is made. An indication that the request to increase the processing capacity of the set of resources is unavailable is made in response to a determination that the number of operations performed per unit of time by the set of cores associated with the set of resources has not increased.

DETAILED DESCRIPTION

Figure 1:
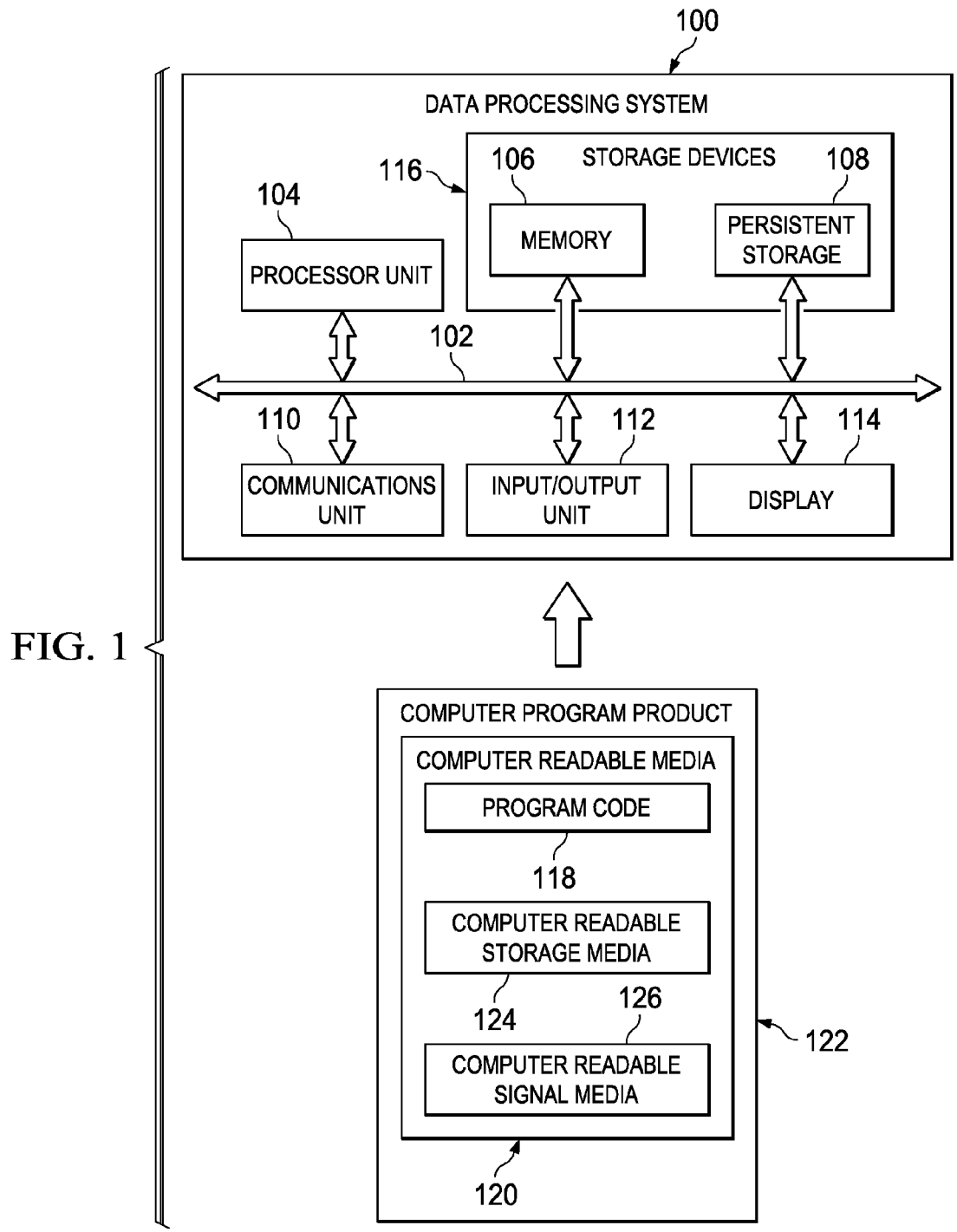
FIG. 1 is an illustration of a block diagram of a data processing system depicted in accordance with an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Turning now to FIG. 1, a block diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a number of processors, a multi-processor core, or some other type of processor, depending on the particular implementation. A number, as used herein with reference to an item, means one or more items. Further, processor unit 104 may be implemented using a number of heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation.

For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be computer readable storage media 124 or computer readable signal media 126. Computer readable storage media 124 may include, for example, an optical or magnetic disk that is inserted or placed into a drive or other device that is part of persistent storage 108 for transfer onto a storage device, such as a hard drive, that is part of persistent storage 108. Computer readable storage media 124 also may take the form of a persistent storage, such as a hard drive, a thumb drive, or a flash memory, that is connected to data processing system 100. In some instances, computer readable storage media 124 may not be removable from data processing system 100. In these illustrative examples, computer readable storage media 124 is a non-transitory computer readable storage medium.

Alternatively, program code 118 may be transferred to data processing system 100 using computer readable signal media 126. Computer readable signal media 126 may be, for example, a propagated data signal containing program code 118. For example, computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 118 may be downloaded over a network to persistent storage 108 from another device or data processing system through computer readable signal media 126 for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 104 may take the form of a hardware unit that has circuits that are manufactured or configured for a particular use. This type of hardware may perform operations without needing program code to be loaded into a memory from a storage device to be configured to perform the operations.

For example, when processor unit 104 takes the form of a hardware unit, processor unit 104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 118 may be omitted because the processes for the different embodiments are implemented in a hardware unit.

In still another illustrative example, processor unit 104 may be implemented using a combination of processors found in computers and hardware units. Processor unit 104 may have a number of hardware units and a number of processors that are configured to run program code 118. With this depicted example, some of the processes may be implemented in the number of hardware units, while other processes may be implemented in the number of processors.

As another example, a storage device in data processing system 100 is any hardware apparatus that may store data. Memory 106, persistent storage 108, and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106, or a cache, such as found in an interface and memory controller hub that may be present in communications fabric 102.

As another example, a storage device in data processing system 100 is any hardware apparatus that may store data. Memory 106, persistent storage 108, and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106, or a cache such as found in an interface and memory controller hub that may be present in communications fabric 102.

The different illustrative embodiments recognize and take into account a number of different considerations. For example, the different illustrative embodiments recognize that attempts to increase processing capacity in a data processing system may not meet expectations. For example, a data processing system may have processor units with more than one core. Some cores in the processor units may be inactive. The processing capacity in the data processing system may be increased by activating cores that are inactive. A core may be activated at a frequency having a value. One may expect that the number of operations increased per second would be equal to the value of the frequency.

However, the different illustrative embodiments recognize that activating cores increases the use of power in the data processing system. A data processing system may have limitations on an amount of power that may be used. To prevent the use of power from exceeding the limitations, the frequency of the cores that are active may be decreased. Decreasing the frequency may decrease the processing capacity of the cores.

In another example, memory may operate slower to save power. With memory operating slower, cores may have to wait to read data from or write data to memory. Cores having to wait may also decrease the processing capacity of the cores.

The different advantageous embodiments further recognize that devices within the data processing system may be affected by the increase in the use of power. For example, a data processing system may have separate partitions. An increase in the use of power by one partition may cause the use of power by another partition to be decreased.

Thus, the different illustrative embodiments provide a method, computer program product, and apparatus for managing power in a data processing system. In an illustrative embodiment, a core is activated in the data processing system and configured to operate at a frequency in response to receiving a request to increase a processing capacity of a set of resources in the data processing system. A determination whether a use of power resulting from activating the core configured to operate at the frequency meets a policy for the use of the power in the data processing system is made. A set of parameters associated with devices in the set of resources are adjusted to meet the policy for the use of power in the data processing system in response to a determination that the use of power does not meet the policy. A determination whether a number of operations performed per unit of time by a set of cores associated with the set of resources increased after activating the core is made. An indication that the request to increase the processing capacity of the set of resources is unavailable is made in response to a determination that the number of operations performed per unit of time by the set of cores associated with the set of resources has not increased.

As used herein, a set when referring to objects means one or more objects. Also as used herein, a first component may be considered to be associated with a second component by being secured to the second component, bonded to the second component, fastened to the second component, and/or connected to the second component in some other suitable manner. The first component also may be connected to the second component through using a third component. The first component may also be considered to be associated with the second component by being formed as part of and/or an extension of the second component.

Figure 2:
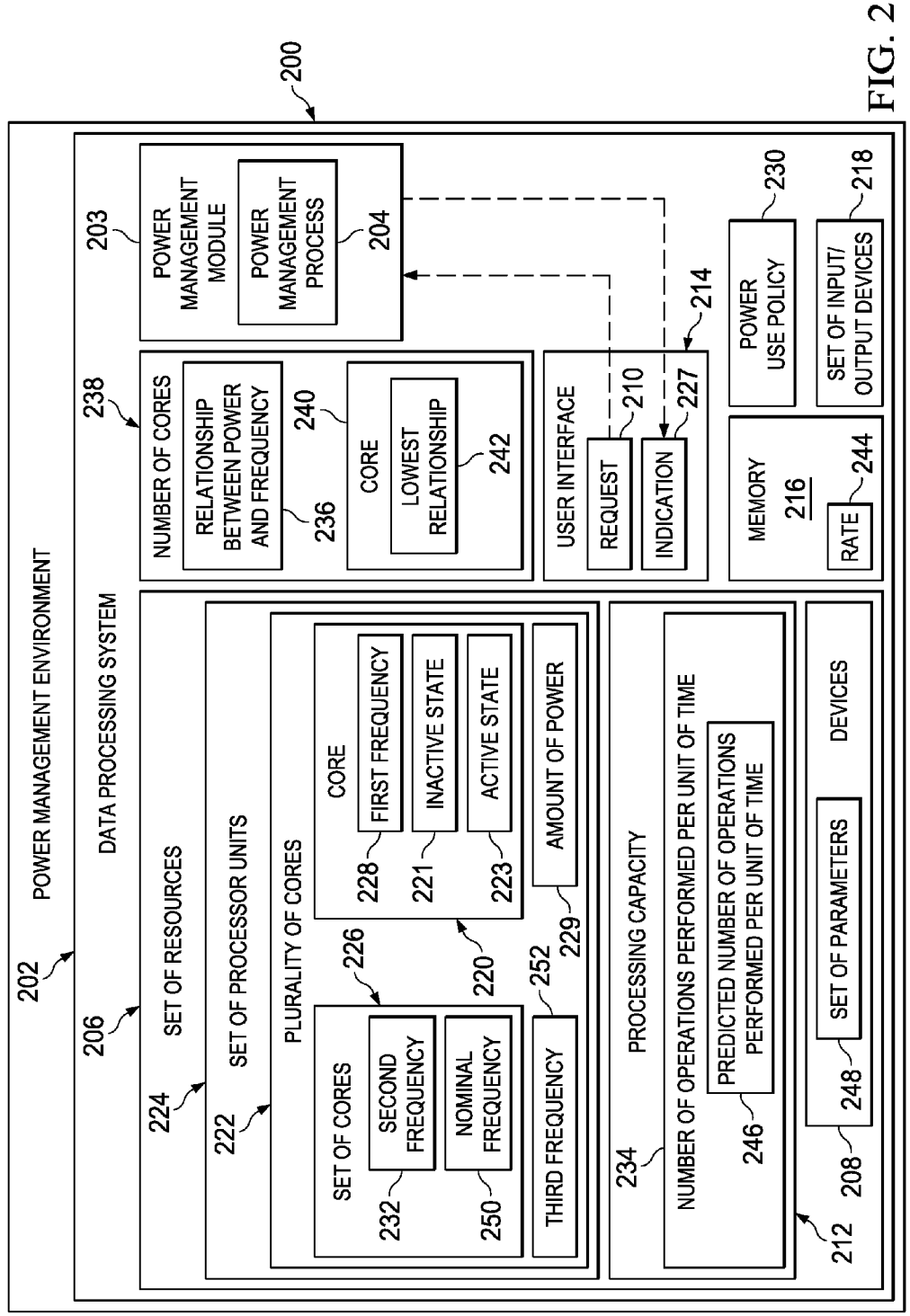
FIG. 2 is an illustration of a block diagram of a power management environment depicted in accordance with an illustrative embodiment.

With reference now to FIG. 2, an illustration of a block diagram of a power management environment is depicted in accordance with an illustrative embodiment. Power management environment 200 is an environment in which illustrative embodiments may be implemented. In an illustrative embodiment power management environment 200 is implemented in data processing system 202. Data processing system 202 may be an example of one implementation of data processing system 100 in FIG. 1.

Data processing system 202 includes power management module 203 and set of resources 206. Power management module 203 manages the use of power in data processing system 202. For example, power management module 203 may manage the use of power by set of resources 206. Power management module 203 may include any combination of hardware and/or software to manage the use of power is data processing system 202. For example, power management module 203 may manage the use of power using hardware without the need for program code. In other examples, power management process 204 in power management module 203 may contain program code for management of the use of power in data processing system.

Set of resources 206 includes devices 208. Devices 208 may include any number of different devices that may be present in set of resources 206 in data processing system 202. Devices 208 may include devices such as for example without limitation, processor unit 104, memory 106, persistent storage 108, communications unit 110, input/output (I/O) unit 112, and display 114 in FIG. 1. Devices 208 may also include devices that are external to data processing system 202. For example without limitation, devices 208 may include devices connected to data processing system such as a camera or external storage device connected by a universal serial bus (USB) or other suitable connector, for example.

In these illustrative embodiments, power management process 204 receives request 210. Power management process 204 may receive request 210 from a user via user interface 214. In these examples, request 210 is a request for an increase in capacity or performance in set of resources 206. For example, request 210 may be a request for capacity upgrade on demand (CUoD).

In one example, request 210 is a request to increase processing capacity 212 of set of resources 206. In another example, request 210 is a request for an increase in memory 216 for set of resources 206. In yet another illustrative example, request 210 may be a request for an increase in set of input/output devices 218 for set of resources 206.

When power management process 204 receives request 210 to increase processing capacity 212 of set of resources 206, power management process 204 may decide whether to activate core 220 and approve request 210. In these examples, core 220 is a core in plurality of cores 222 in set of processor units 224. For example, set of cores 226 in plurality of cores 222 are active in set of processing units 224. As used herein, "active" when referring to a core in a processor means that the core is presently available to operate and execute instructions and perform operations for the processor. Core 220 may be inactive within set of processor units 224. As used herein, "inactive" when referring to a core in a processor means that the core is not presently available to execute instructions and perform operations for the processor. For example, core 220 have inactive state 221 and active state 223. Inactive state 221 of core 220 is when core 220 is not presently available to execute instructions. For example, core 220 may be in a sleep state while in inactive state 221 in set of processor units 206.

Activating core 220 in set of resources 206 may increase processing capacity 212 in set of resources 206. However, before activating core 220, power management process 204 may determine an impact that activating core 220 may have on devices 208 in set of resources 206. For example, core 220 may be configured to operate at first frequency 228. In this example, power management process 204 may select first frequency 228 to match second frequency 232 of set of cores 226. Operating at first frequency 228, core 220 may use amount of power 229. Power management process 204 may determine amount of power 229 from activating core 220 at first frequency 228 using data known about core 220. For example, amount of power 229 used by core 220 may be calculated using first frequency 228 and the voltage applied to core 220.

Power management process 204 may determine whether the use of power from activating core 220 meets power use policy 230 in data processing system 202. In these illustrative example, power use policy 230 includes and rules on the use of power in data processing system 202. For example, only a certain amount of power may be available for use in data processing system 202. Power use policy 230 may include rules regarding which devices may use certain amounts of the power available in data processing system 202. In another example, limitations on the use of power in data processing system 202 may be created. Uses of power in data processing system 202 that exceed limitations may cause devices 208 in data processing system 202 to operate improperly. For example, the use of power by devices 208 in data processing system 202 may produce heat. When devices 208 reach certain temperatures, devices 208 may not operate properly. In these examples, the limitations in power use policy 230 may be specific to devices 208. For example, limitations on the use of power may be specific to set of resources 206 and set of processor units 224.

If power management process 204 determines that the use of power resulting from activating core 220 at first frequency 228 does meet power use policy 230, power management process 204 will activate core 220 at first frequency 228. For example, power management process 204 will activate core 220 by establishing first frequency 228 and scheduling instructions on core 220. On the other hand, if the use of power does not meet power use policy 230, then power management process 204 will deny request 210 to increase processing capacity 212. Power management process 204 may provide indication 227 that request 210 to increase processing capacity 212 is unavailable. Power management process 204 may provide indication 227 to a user via user interface 214.

In another example, power management process 204 may activate core 220 at first frequency 228 and monitor an effect of the use of power in data processing system 202. In this example, first frequency 228 has a value that is lower than a desired value for core 220. For example, power management process 204 may activate core 220 at a minimum operating frequency of core 220. Power management process 204 then monitors the increase in the use of power resulting from activating core 220 at first frequency 228.

In these examples, a minimum operating frequency is the lowest frequency that the core can operate at. The minimum frequency may be a physical property of the core, the result of its logical design, or due to other property of the system such as the size of the busses interconnecting the various components of the system. No matter what the cause of the limitation, there is a well-defined minimum operating frequency.

Power management process 204 then increases first frequency 228 of core 220. Each time first frequency 228 is increased, power management process 204 monitors the use of power in data processing system 202 to determine whether the increase in power from increasing first frequency 228 meets power use policy 230. As long as, the use of power meets power use policy 230, power management process 204 will continue to increase first frequency 228. If the value for first frequency 228 reaches the desired value for first frequency 228, power management process 204 will approve request 210 to increase processing capacity 212. Power management process 204 will allow core 220 and set of cores 226 to operate at first frequency 228. The increase in processing capacity 212 of set of resources 206 is successful and meets expectations.

In these illustrative examples, the desire value for first frequency 228 is selected based on an amount of increase in processing capacity 212 for set of resources 206. Power management process 204 monitors the use of power from activating core 228 and increasing first frequency 228 to determine an effect the use of power may have on cores in set of cores 226. For example, power consumption by core 220 may cause a decrease in power consumption available for cores in of set of cores 226 in order for the use of power by set of resources 206 to meet power use policy 230. The decrease in power consumption available for set of cores 226 may cause a decrease in second frequency 232. The decrease in second frequency 232 means that fewer operations are performed by set of cores 226 per unit of time, which may result in request 210 for increase in processing capacity 212 not meeting expectations. Thus, power management process 204 monitors the effect activating core 220 has on set of cores 226.

If however, before reaching the desired value for first frequency 228, the use of power from increasing first frequency 228 does not meet power use policy 230, power management process 204 may deny request 210 to increase processing capacity 212 of set of resources 206. For example, if the use of power from increasing first frequency 228 causes a decrease in the processing capacity of set of cores 226, power management process 204 may determine that the use of power from increasing first frequency 228 does not meet power use policy 230. Power management process 204 will deactivate core 220. For example, increasing first frequency 228 of core 220 may result in an increase in the use of power that does not meet power use policy 230. Since the value of first frequency 228 has not reached the value of second frequency 232 of set of cores 226 not all of the cores within set of resources 206 can operate at the same frequency. Core 220 operating at first frequency 228 less than second frequency 232 will result in a lower increased in processing capacity 212 than expected. As a result, power management process 204 may provide indication 227 that request 210 to increase processing capacity 212 is unavailable under power use policy 230.

In a further example, power management process 204 may decrease second frequency 232 of set of cores 226 while increasing first frequency 228 of core 220. For example, power management process 204 may again activate core 220 at first frequency 228 having a value lower than the value for second frequency 232. In this example, power management process 204 may alternate between increasing first frequency 228 and decreasing second frequency 232. Each time a frequency is adjusted, power management process 204 monitors the use of power in set of resources 206. Power management process 204 will continue to move first frequency 228 and second frequency 232 towards each other as long as the use of power meets power use policy 230.

If the value for first frequency 228 reaches the value for second frequency 232, power management process 204 will determine whether number of operations performed per unit of time 234 in set of resources 206 increased. If the number of operations performed per unit of time 234 in set of resources 206 increased, power management process 204 will allow request 210 for an increase in processing capacity 212 in set of resources 206. Number of operations performed per unit of time 234 increasing results in processing capacity 212 of set of resources 206 increasing. Request 210 to increase processing capacity 212 was successful. Core 220 will remain in active state 223 in set of resources 206.

In this example, core 220 and set of cores 226 operate at the same frequency. However, this same frequency may be lower than second frequency 232 of set of cores 226 before activation of core 220. While the amount of increase in processing capacity 212 may not meet expectations, the increase may be all that is available under power use policy 230. If however, increasing first frequency 228 of core 220 results in a use of power that does not meet power use policy 230, power management process 204 will deny request 210 and deactivate core 220. Additionally, if the number of operations performed per unit of time 234 in set of resources 206 did not increase, power management process 204 will deny request 210 and deactivate core 220.

In yet another example, power management process 204 may select which core in number of cores 238 to activate in data processing system 202. Power management process 204 may determine relationship between power and frequency 236 for number of cores 238 in data processing system 202. For example, different cores in number of cores 238 may respond differently to increases in frequency. Generally speaking, as frequency increases the power consumed by the core increases as well. However, different cores in number of cores 238 may have different values for capacitance and voltage. Changes in the values for these parameters affects relationship between power and frequency 236. Additionally, power management process 204 may identify a relationship between power and frequency 236 based on monitoring the power usage in of number of cores 238 while adjusting the frequency.

Power management process 204 may select core 240 having lowest relationship 242 between power and frequency from among number of cores 238. For example, lowest relationship 242 may be that core 240 have the lowest increase among number of cores 238 in the amount of power used as frequency is increased. In another example, power management process 204 may develop an equation representing a plot of power versus frequency for each of number of cores 238. Power management process 204 may determine lowest relationship 242 by core 240 as the core having the equation with the smallest derivative from among number cores 238. Power management process 204 then activates core 240 as core 220 to be activated in set of resources 206. The frequency for core 240 may be selected and increased as discussed above with regard to first frequency 228 of core 220.

In these illustrative examples, request 210 may also be a request for an increase in memory 216 in set of resources 206. For example, a user may request additional memory in a capacity upgrade on demand. Power management process 204 will determine an increase in the use of power that will result from increasing memory 216 in set of resources 206.

For example, power management process 204 may identify rate 244 that data is written to and read from memory 216. Rate 244 affects the use of power in memory 216. Power management process 204 may adjust rate 244 by throttling. Throttling is a process of inserting rest periods in operations performed on memory 216. For example, for certain periods of time memory 216 may be inactive. The inactivity of memory 216 reduces rate 244 that data is written to and read from memory 216. Reducing rate 244 also reduces the use of power by memory 216 because memory may be inactive for periods of time.

Power management process 204 then determines whether the increase in the use of power meets power use policy 230. If the increase meets power use policy 230, power management process 204 will grant request 210 for the increase in memory 216 in set of resources 206. For example, memory 216 may be part of set of resources 206. Memory 216 may have portions that are inactive. Power management process 204 may increase memory 216 in set of resources 206 by activating portions of memory 216 that are inactive.

If however, the increase does not meet power use policy 230, power management process 204 will deny request 210 for the increase in memory 216. Power management process 204 may provide indication 227 that request 210 is unavailable. Power management process 204 may provide indication 227 to a user via user interface 214.

In these illustrative examples, request 210 may also be a request for an increase in set of input/output devices 218 for set of resources 206. For example, a user may request additional input/output devices in a capacity upgrade on demand. Set of input/output devices 218 may include, for example without limitation, persistent storage and/or communications units such as persistent storage 108 and communications unit 110 in FIG. 1.

Power management process 204 determines an increase in the use of power that will result from an increase in set of input/output devices 218 for set of resources 206. Power management process 204 then determines whether the increase in the use of power meets power use policy 230. If the increase meets power use policy 230, power management process 204 will grant request 210 for the increase in set of input/output devices 218 for set of resources 206.

For example, set of input/output devices 218 may be part of set of resources 206. Set of input/output devices 218 may include devices that are inactive. Power management process 204 may increase set of input/output devices 218 in set of resources 206 by activating the devices in set of input/output devices 218 that are inactive.

If however, the increase in the use of power does not meet power use policy 230, power management process 204 will deny request 210 for the increase in set of input/output devices 218 for set of resources 206. Power management process 204 may provide indication 227 that request 210 is unavailable. Power management process 204 may provide indication 227 to a user via user interface 214.

In these illustrative embodiments, power management process 204 can provide feedback to a user regarding request 210. For example, power management process 204 may predict results of implementing request 210 before granting request 210. Power management process 204 may provide a user with the results. The user is then enabled to decide whether to proceed with request 210 having knowledge of what may be expected.

For example, request 210 may be a request to increase processing capacity 212 in set of resources by activating core 220. Prior to granting request 210, power management process 204 can determine results of activating core 220. As discussed previously, power management process 204 can determine number of operations performed per unit of time 234 for set of cores 226 operating at second frequency 232 before activation of core 220. Power management process 204 can also predict a frequency that set of cores 226 and core 220 can operate at while meeting power use policy 230 for data processing system 202. Based on the frequency predicted, power management process 204 can predict predicted number of operations performed per unit of time 234.

Power management process 204 can then present the user with the difference between number of operations performed per unit of time 234 and predicted number of operations performed per unit of time 246. The difference represents an amount of increase in processing capacity 212 that can be expected by activating core 220. With this information, the user may decide whether to proceed with request 210 to increase processing capacity 212.

Power management process 204 can also present the user with an impact activating core 220 may have on other devices in set of resources 206. For example, to meet power use policy 230, power management process 204 may adjust rate 244 of memory 216. Adjusting rate 244 of memory 216 may reduce the use of power in set of resources 206 to allow core 220 to operate at first frequency 228. Power management process 204 may present the user with the adjustment to rate 244 of memory 216 that allows the increase in processing capacity 212. With this information, the user may decide whether to proceed with request 210 to increase processing capacity 212.

In another example, if request 210 for increased capacity fails, power management process 204 can provide the user with feedback regarding the cause of the failure. As discussed above, power management process 204 may deny request 210. Additionally, power management process 204 may provide feedback via user interface 214 regarding why request 210 was denied. For example, power management process 204 may indicate that an increase in processing capacity 212 is unavailable under power use policy 230. In one example, the user may then be able to change power use policy 230 so that request 210 may be granted.

In these illustrative examples, power management process 204 may monitor set of resources 206 and manage request 210. Power management process 204 monitors use of power in data processing system following request 210 being granted. If the use of power does not meet power use policy 230, power management process 204 can adjust set of parameters 248 of devices 208 in set of resources 206. For example, power management process 204 may adjust rate 244 for memory 216. Power management process 204 may adjust second frequency 232 of set of cores 226 or the voltage supplied to set of cores 206. The adjustments to the frequency and the voltage may be referred to as scaling. Power management process 204 may scale the frequency and the voltage to meet power use policy 230. Power management process 204 may also deactivate cores in set of cores 226, portions of memory 216, and/or devices in set of input/output devices 218.

In one illustrative example, power management process 204 may identify the number of cores that should be in active state 223 in set of resources 206 to maintain processing capacity 212. Power management process 204 monitors second frequency 232 that set of cores 226 are operating. Power management process 204 can then compare second frequency 232 with nominal frequency 250 for set of cores 226. Nominal frequency 250 is the expected frequency that set of cores 226 can operate at without reductions in frequency. If second frequency 232 is less that nominal frequency 250, power management process 204 may predict results of deactivation of at least one core in set of cores 226. For example, power management process 204 may identify third frequency 252 that set of cores 226 can operate at while maintaining processing capacity 212 with at least one core deactivated in set of cores 226. Thus, set of resources 206 can maintain processing capacity with fewer cores activated. Having fewer cores activated may result in power savings and cost savings.

In another example, power management process 204 may monitor for adjustments to power use policy 230. For example, if limitations in power use policy 230 are increased, power management process 204 may reduce the amount of power used by set of resources 206. As discussed, power management process 204 may adjust set of parameters 248 for devices 208 in set of resources 206 to meet changes in power use policy 230.

The illustration of power management environment 200 in FIG. 2 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, without limitation, in some illustrative embodiments, set of resources 206 in data processing system 200 may be a partition within data processing system 202. Set of resources 206 may be a physical partition with devices 208 located within a common housing. Memory 216 and set of input/output devices 218 may also be located within the common housing. In other illustrative embodiments, set of processor units 224, memory 216, and set of input/output devices 218 may all be part of a pool of resources that are connected via one or more communications unit and located externally to one another. Power management process 204 may allocate devices 208 to form set of resources 206. Set of resources 206 may be used by one or more users at the same time.

In another example, core 220 may not be part of set of resources 206. All cores within set of resources 206 may be operating when power management process 204 receives request 210 to increase processing capacity 212. Power management process 204 may allocate core 220 to set or resources 206 from a different set of resources. In a similar manner, memory 216 and set of input/output devices 218 may also be allocated to set of resources 206.

In yet another example, request 210 may be a temporary request. Request 210 may be a request for increased capacity for only a period of time. After the period of time, power management process 204 may deactivate devices that were activated to grant request 210.

Figure 3:
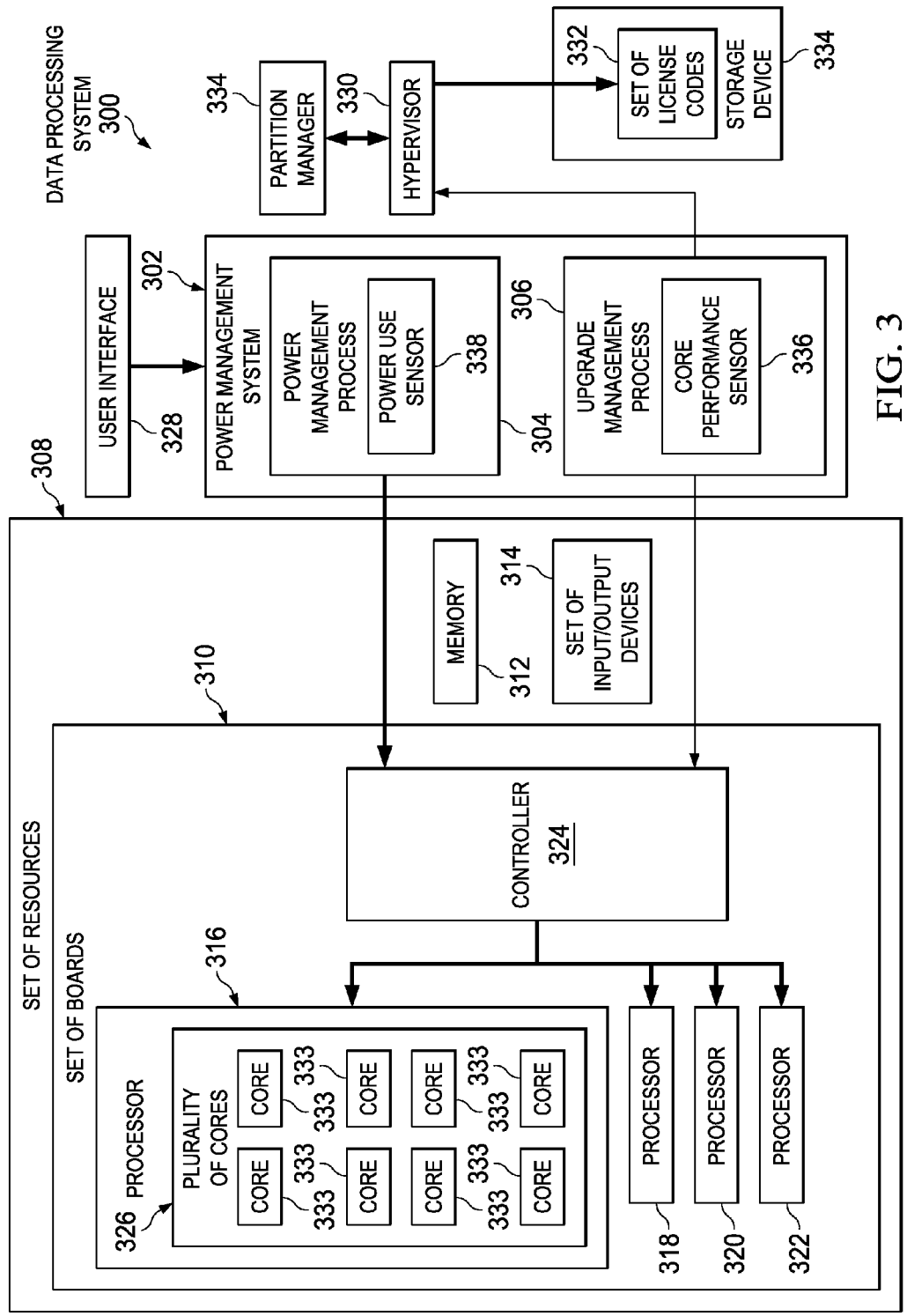
FIG. 3 is an illustration of a block diagram of a power management system in a data processing system depicted in accordance with an illustrative embodiment.

With reference now to FIG. 3, an illustration of a block diagram of a power management system in a data processing system is depicted in accordance with an illustrative embodiment. Data processing system 300 is an example of one implementation of data processing system 202 in FIG. 2. As depicted, data processing system 300 includes power management system 302. Power management system 302 manages the use of power in data processing system 300.

In these illustrative embodiments, power management system 302 includes power management process 304 and upgrade management process 306. Power management process 304 and upgrade management process 306 may be examples of implementations of power management process 204 in FIG. 2. For example, power management process 304 may manage the use of power by devices in data processing system 300. Upgrade management process 306 may manage a request for an increased capacity such as request 210 in FIG. 2, for example.

Data processing system 300 further includes set of resources 308. Set of resources 308 includes set of boards 310, memory 312, and set of input/output devices 314. Set of boards 310, memory 312, and set of input/output devices 314 are all resources in set of resources 308 in these examples. Set of boards 310 includes a number of processors. For example, set of boards 310 includes processor 316, processor 318, processor 320, and processor 322. In other examples, set of boards 310 can include any number of processors. In these examples, set of boards 310 may be any surface for placement of and providing connections between components in a data processing system. For example without limitation, set of boards 310 may be a printed circuit board, a motherboard, a breadboard and/or other suitable surfaces.

In these illustrative examples, set of boards 310 also includes controller 324. Controller 324 controls processors 316, 318, 320, and 322. For example, controller 324 can activate processor 316 or one of the cores in plurality of cores 326 inside processor 316. Controller 324 can also control the frequency that each of the cores in plurality of cores 326 operate. Controller 324 can also control the voltage applied to the cores in plurality of cores 326. Controller 324 may include hardware devices such as, for example without limitation, a microcontroller, a processor, voltage and frequency sensors, an oscillator and/or and other suitable devices. In other examples, controller 324 may be a software process that includes program code for controlling processors 316, 318, 320, and 322.

In these illustrative examples, power management process 304 and upgrade management process 306 communicate with controller 324 to manage resources in set of resources 308. For example, power management system 302 may receive a request to increase capacity in set of resources 308 via user interface 328. The request may be a request to increase processing capacity by activating cores in plurality of cores 326. Some cores in plurality of cores 326 may be in inactive state 221. Set of resources 308 may only be allowed to have a certain number of cores active. In other words, set of resources may only be licensed to use a certain number of cores in plurality of cores 326.

In this example, the request may include a license code. The license code may include an identifier of a core and a key to activate the core. Power management system 302 may receive the license code and communicate with hypervisor 330 to determine which cores are licensed in plurality of cores 326. In these examples, hypervisor 330 is a module which allows multiple operating systems to run on a data processing system.

Hypervisor 330 may then compare the license code from the request with set of license cores 332 stored in storage device 334. In these examples, each core in plurality of cores 326 has a license code in set of license codes 332. If the license code from the request matches a license code in set of license codes 332, hypervisor 330 determines which core in plurality of cores 326 corresponds to the license code matched in set of license codes 332. The core determined is core 333 to be licensed in set of resources 308. Hypervisor 330 communicates core 333 to be licensed in set of resources 308 to power management system 302. On the other hand, if the license code in the request does not match a license code in set of license codes 332, the request is denied.

Additionally, if set of resources 308 is a partition within data processing system 300, hypervisor 330 may communicate with partition manager 334 to determine which resources are part of the partition. For example, the request to increase the capacity may be a request to increase a capacity in a particular partition. Hypervisor 330 may confirm that core 333 requested to be licensed in plurality of cores 326 is part of the partition. Partition manager 334 may maintain a listing of resources that are part of particular partitions. If core 333 requested to be licensed is not part of the partition requesting the capacity increase, partition manager 334 may allocate core 333 to the partition. Then hypervisor 330 can communicate the core to be licensed in set of resources 308 to power management system 302.

In these illustrative examples, power management system 302 receives information identifying the core to be licensed in plurality of cores 326. Upgrade management process 306 may then send instructions to controller 324 to activate the core to be licensed in plurality of cores 326. In this example, upgrade management process includes core performance sensor 336. Core performance sensor 336 monitors performance of cores in plurality of cores 326. For example, core performance sensor 336 may monitor a frequency that cores active in plurality of cores 326 operate. Upgrade management process 306 may activate core 333 at the same frequency the other active cores in plurality of cores 326, as previously discussed with regard to core 220 in FIG. 2. In other examples, upgrade management process 306 may activate the core at a first frequency and adjust the frequency to increase the processing capacity of plurality of cores 326 in set of resources 308.

Power management process 304 includes power use sensor 338. Power use sensor 338 monitors use of power by the resources in set of resources 308. As discussed previously with regard to power management process 204 in FIG. 2, power management process 304 may adjust parameters associated with resources in set of resources to meet a power use policy, such as power use policy 230 in FIG. 2, for example. For example, power management process 304 may scale the frequencies of cores in plurality of cores 326 using controller 324. Upgrade management process 306 will continually monitor the processing capacity in set of resources 308. Additionally, upgrade management process may determine whether processing capacity has increased by activating core 333.

The illustration of power management system 302 in data processing system 300 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, without limitation, in some illustrative embodiments power management system 302 may not be part of data processing system 300. Power management system 302 may be located remotely from data processing system 300. For example, power management process 304 and upgrade management process 306 may be running on a computing system located remotely from data processing system. Power management process 304 and upgrade management process 306 may communicate with data processing to monitor and control the use of power in data processing system 300.

In other illustrative embodiments, set of resources 308 may include any number of boards. Each board in set of resources 308 may have a separate controller, such as controller 324 for example. Controller 324 may also control processors on more than one board in set of resources 308. In some illustrative embodiments, sensors such as core performance sensor 336 and power use sensor 338 may be located on each board in set of resources. In other examples, set of resources 308 may include sensors for each resource. Sensors in core performance sensor 336 and power use sensor 338 may be part of individual processors in processor 316 as well as cores in plurality of cores 326.

Figure 4:
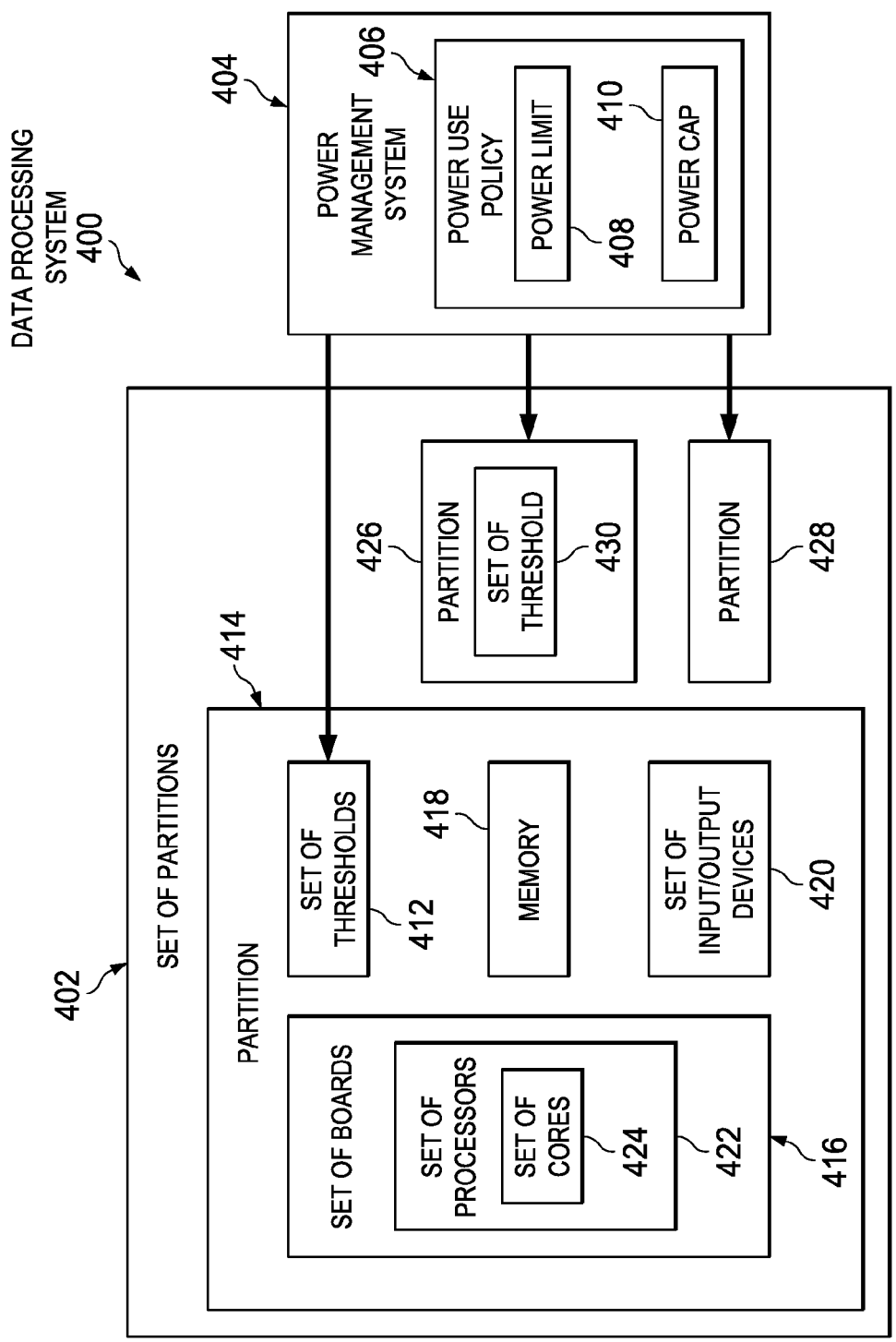
FIG. 4 is an illustration of a block diagram of a set of partitions in a data processing system is depicted in accordance with an illustrative embodiment.

With reference now to FIG. 4, an illustration of a block diagram of a set of partitions a data processing system is depicted in accordance with an illustrative embodiment. Data processing system 400 includes set of partitions 402 and power management system 404. Power management system 404 may be an example of one implementation of power management system 302 in FIG. 3.

In these illustrative examples, power management system 404 includes power use policy 406 for set of partitions 402 in data processing system 400. Power use policy 406 is a policy that specifies the use of power in data processing system 400. For example, power use policy 406 may include power limit 408. Power limit 408 may be a limitation on an amount of power that is available for use in data processing system 400. Power limit 408 may also be a limitation on the amount of power that can be consumed in data processing system 400. Consumption of power in data processing system 400 produces heat. The heat produced may be able to be removed at a rate of time. Thus, power limit 408 can be based on how quickly heat produced in data processing system 400 can be removed.

Power use policy 406 may include power cap 410. Power cap 410 may include limitations for the use of power in data processing system 400. For example, power cap 410 may include a number of user selected values for the use of power in data processing system 400. The values may be selected to achieve goals for the use of power in data processing system 400. For example, values in power cap 410 may be selected based on a cost of using a certain amount of power. Values in power cap 410 may be selected based on properties of devices in data processing system 400. For example, certain devices in data processing system 400 may operate less efficiently at certain temperatures. Values in power cap 410 may be selected such that the devices do not reach those temperatures.

In these illustrative examples, power use policy 406 may include set of thresholds 412 for partition 414. Set of thresholds 412 may include power use thresholds for devices in partition 414. For example, set of thresholds 412 may include power use thresholds for each of set of boards 416, memory 418, and set of input/output devices 420. Thus, power use thresholds in set of thresholds 412 may be specific to devices in partition 414. Similarly, each processor in set of processors 422 and each core in set of cores 424 may have thresholds in set of thresholds 412 for the use of power.

Power management system 404 may monitor power use by devices in partition 414. Power management system 404 may determine whether the use of power by devices in partition 414 is within thresholds in set of thresholds 412. If the use of power is not within the thresholds, power management system 404 may determine that the use of power does not meet power use policy 406 for data processing system 400.

Power management system 404 also monitors power use in partitions 426 and 428. For example, power use policy 406 may include set of thresholds 430 for the use of power by devices in partition 426. Set of thresholds 430 may limit the use of power in partition 426. For example, power management system 404 receives a request to increase a capacity in partition 426. Power management system 404 may grant the request of the use of power resulting from granting the request is within set of thresholds 430 and meets power use policy 406. Set of thresholds 430 for partition 426 may insure that increases in the use of power by devices in partition 426 will not affect the use of power by devices in partitions 414 and 428. Thus, power management system 404 may not grant requests to increase capacity in one partition when the request will cause capacity in another partition to be affected.

The illustration of set of partitions 402 in data processing system 400 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, without limitation, in some illustrative embodiments power management system 404 may not be part of data processing system 400. Power management system 404 may be located remotely from data processing system 400. For example, power management process 404 may communicate with data processing system 400 to monitor the use of power in data processing system 400. In other embodiments, set of partitions 402 may be a set of resources that are available within data processing system 400.

Figure 5:
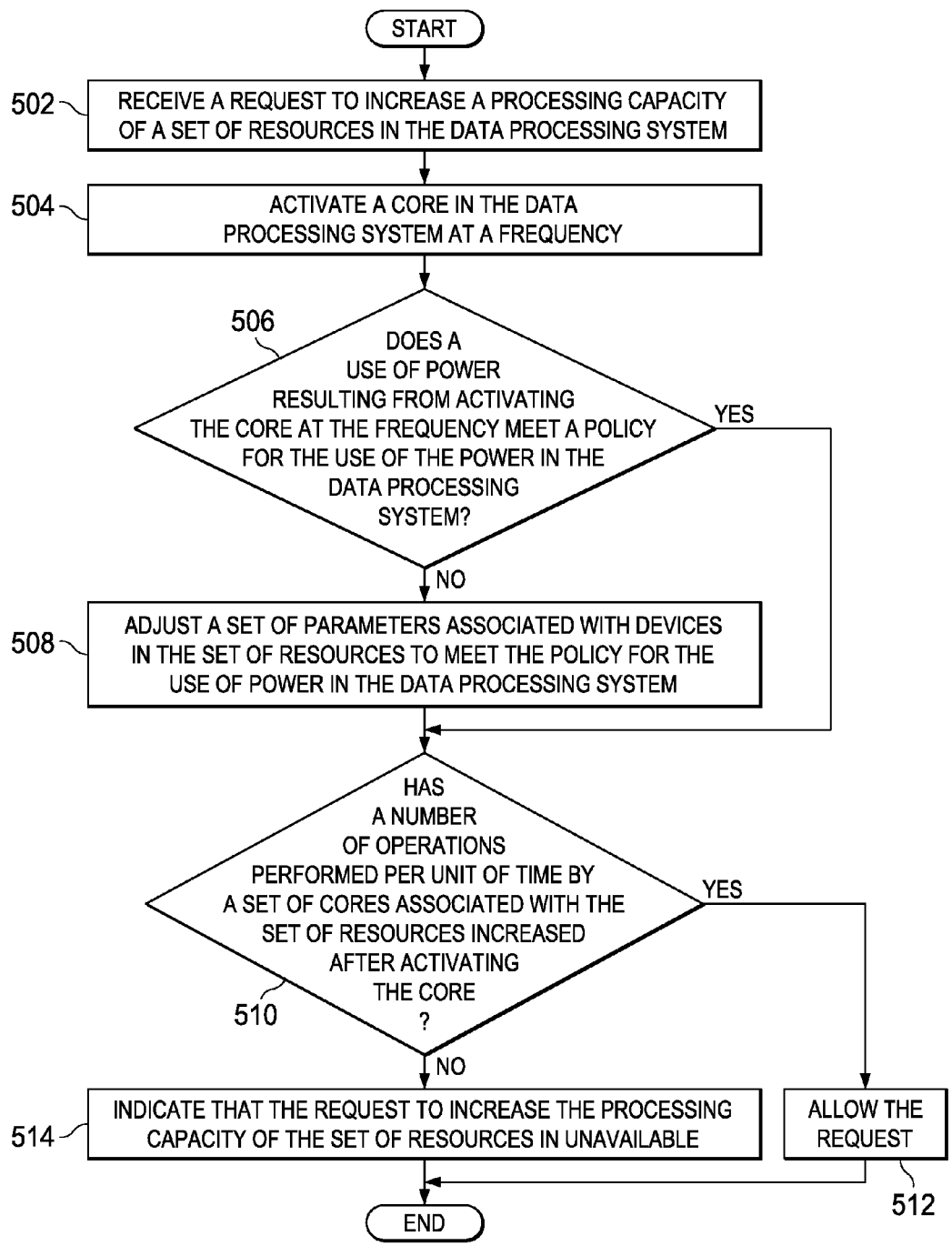
FIG. 5 is a flowchart of a process for a process for managing power in a data processing system depicted in accordance with an illustrative embodiment.

With reference now to FIG. 5, a flowchart of a process for managing power in a data processing system is depicted in accordance with an illustrative embodiment. The process may be performed by power management process 204 running on data processing system 202 in FIG. 2.

The process begins by receiving a request to increase a processing capacity of a set of resources in a data processing system (step 502). The process then activates a core in the data processing system at a frequency (step 504). In step 504, the core may be configured to operate at the frequency. The process may also select the frequency.

Thereafter the process determines whether a use of power resulting from activating the core at the frequency meets a policy for the use of the power in the data processing system (step 506). If the process determines that the use of power does not meet the policy, the process adjusts a set of parameters associated with devices in the set of resources to meet the policy for the use of power in the data processing system (step 508). The process then determines whether a number of operations performed per unit of time by a set of cores associated with the set of resources increased after activating the core (step 510). In step 510, the core activated may be included in the set of cores for the determination.

If the process then determines that the number of operations performed per unit of time increased after activating the core the process allows the request (step 512), with the process terminating thereafter. In step 512, the core remains active operating at the frequency and the request for increase in processing capacity is achieved. If the process determines that the number of operations performed per unit of time has not increased after activating the core, the process indicates that the request to increase the processing capacity of the set of resources is unavailable (step 514), with the process terminating thereafter. In step 514, the core may also be deactivated.

Figure 6:
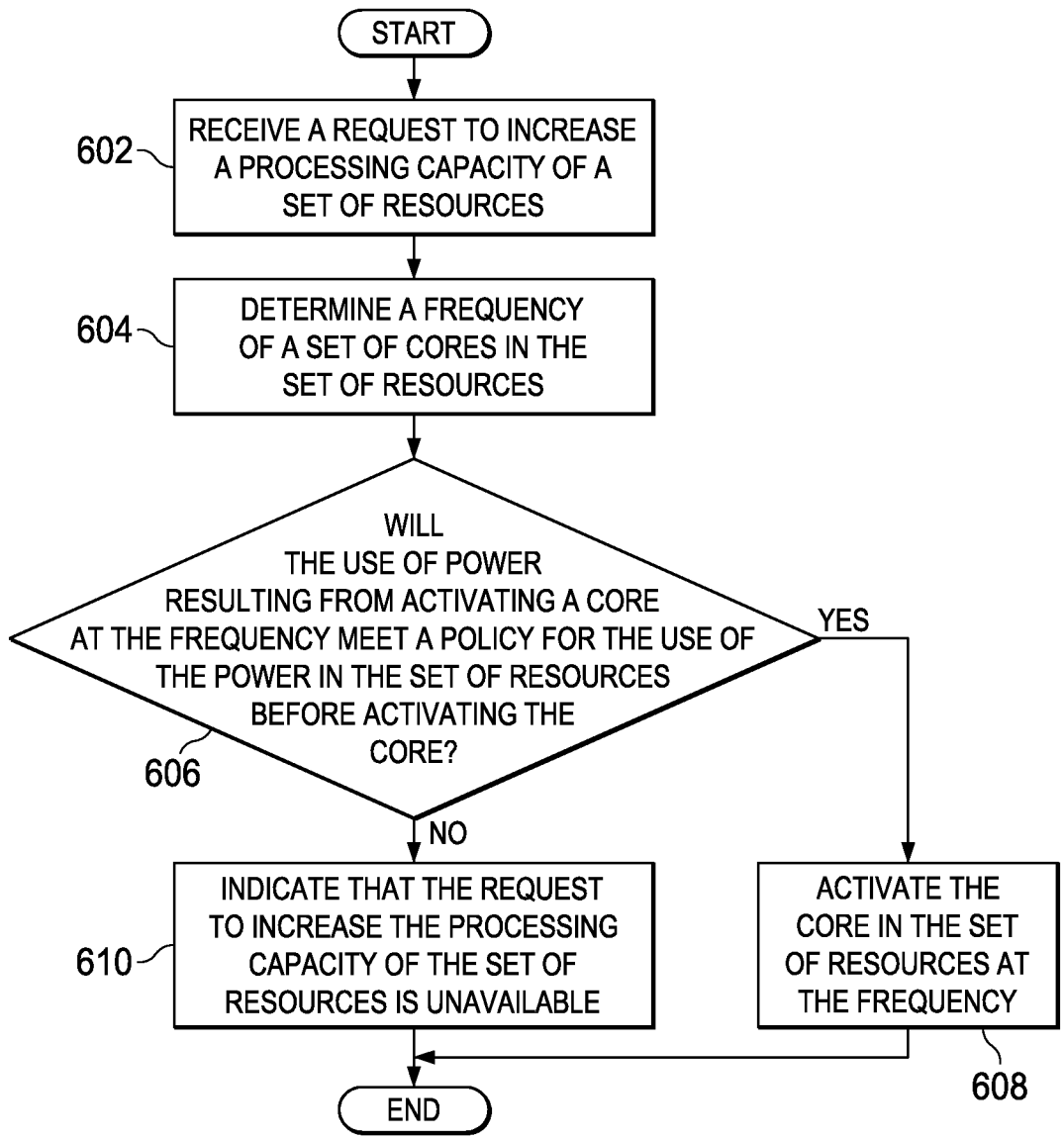
FIG. 6 is a flowchart of a process for determining use of power in a data processing system depicted in accordance with an illustrative embodiment.

With reference now to FIG. 6, a flowchart of a process for determining use of power in a data processing system is depicted in accordance with an illustrative embodiment. The process may be performed by power management process 304 implemented in power management system 302 in FIG. 3.

The process begins by receiving a request to increase a processing capacity of a set of resources (step 602). The process then determines a frequency of a set of cores in the set of resources (step 604). In step 604, the frequency may be determined using a core performance sensor such as core performance sensor 336 in FIG. 3, for example.

Thereafter, the process determines whether the use of power resulting from activating a core at the frequency meets a policy for the use of the power in the set of resources before activating the core (step 606). If the process determines that the use of power meets the policy, the process activates the core in the set of resources at the frequency (step 608). In step 608, the core may be activated using a controller such as controller 324 in FIG. 3, for example. If the process determines that the use of power does not meet the policy, the process indicates that the request to increase the processing capacity of the set of resources is unavailable (step 610), with the process terminating thereafter.

Figure 7:
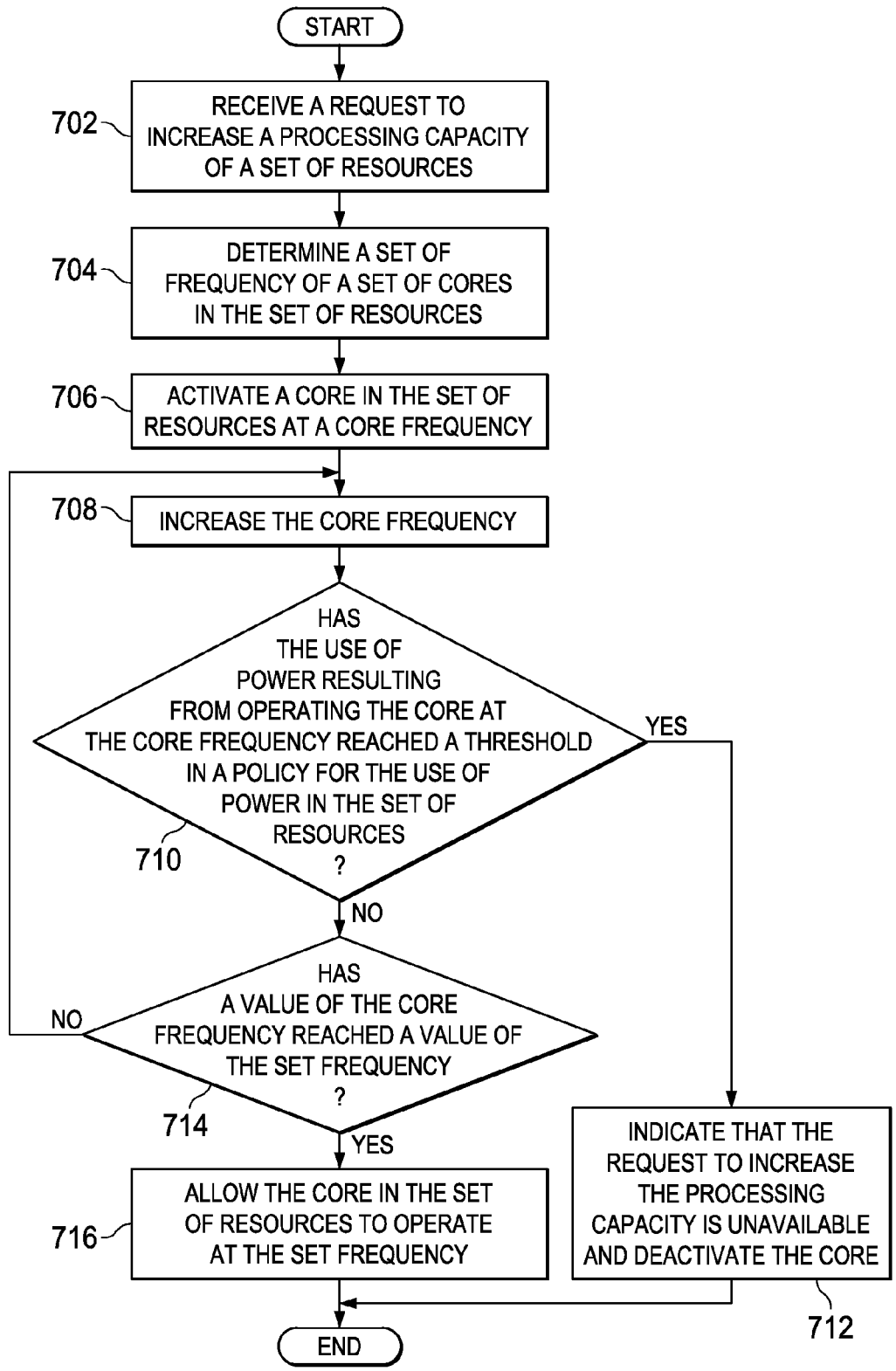
FIG. 7 is a flowchart of a process for increasing a frequency of a core in a data processing system depicted in accordance with an illustrative embodiment.

With reference now to FIG. 7, a flowchart of a process for increasing a frequency of a core in a data processing system is depicted in accordance with an illustrative embodiment. The process may be performed by upgrade management process 306 implemented in power management system 302 in FIG. 3.

The process begins by receiving a request to increase a processing capacity of a set of resources (step 702). The process then determines a set frequency of a set of cores in the set of resources (step 704). In step 704, the set of cores are cores that are active in set of resources. Thereafter, the process activates a core in the set of resources at a core frequency (step 706). In step 706, the core frequency is less than the set frequency. For example, the core frequency may be a minimum frequency for the core. The process then increases the core frequency (step 708). In step 708, the core frequency may be incremented by a predetermined amount.

Thereafter the process determines whether the use of power resulting from operating the core at the core frequency reached a threshold in a policy for the use of power in the set of resources (step 710). For example, in step 710, the threshold may be a limit for the core, a board the core is positioned on, the set of resources, or the data processing system. If the process determines that the use of power has reached the threshold, the process indicates that the request to increase the processing capacity is unavailable and deactivates the core (step 712) with the process terminating thereafter.

If the process determines that the use of power has not reached the threshold, the process determines whether a value of the core frequency has reached a value of the set frequency (step 714). In step 714, the core frequency may have passed the set frequency or be within some nominal range of the set frequency. Either occurrence may result in a determination that the core frequency has reached the set frequency. If the process determines that the core frequency has not reached the set frequency, the process returns to step 708 and increases the core frequency. If the process determines that the core frequency has reached the set frequency, the process allows the core in the set of resources to operate at the set frequency (step 716) with the process terminating thereafter.

Figure 8:
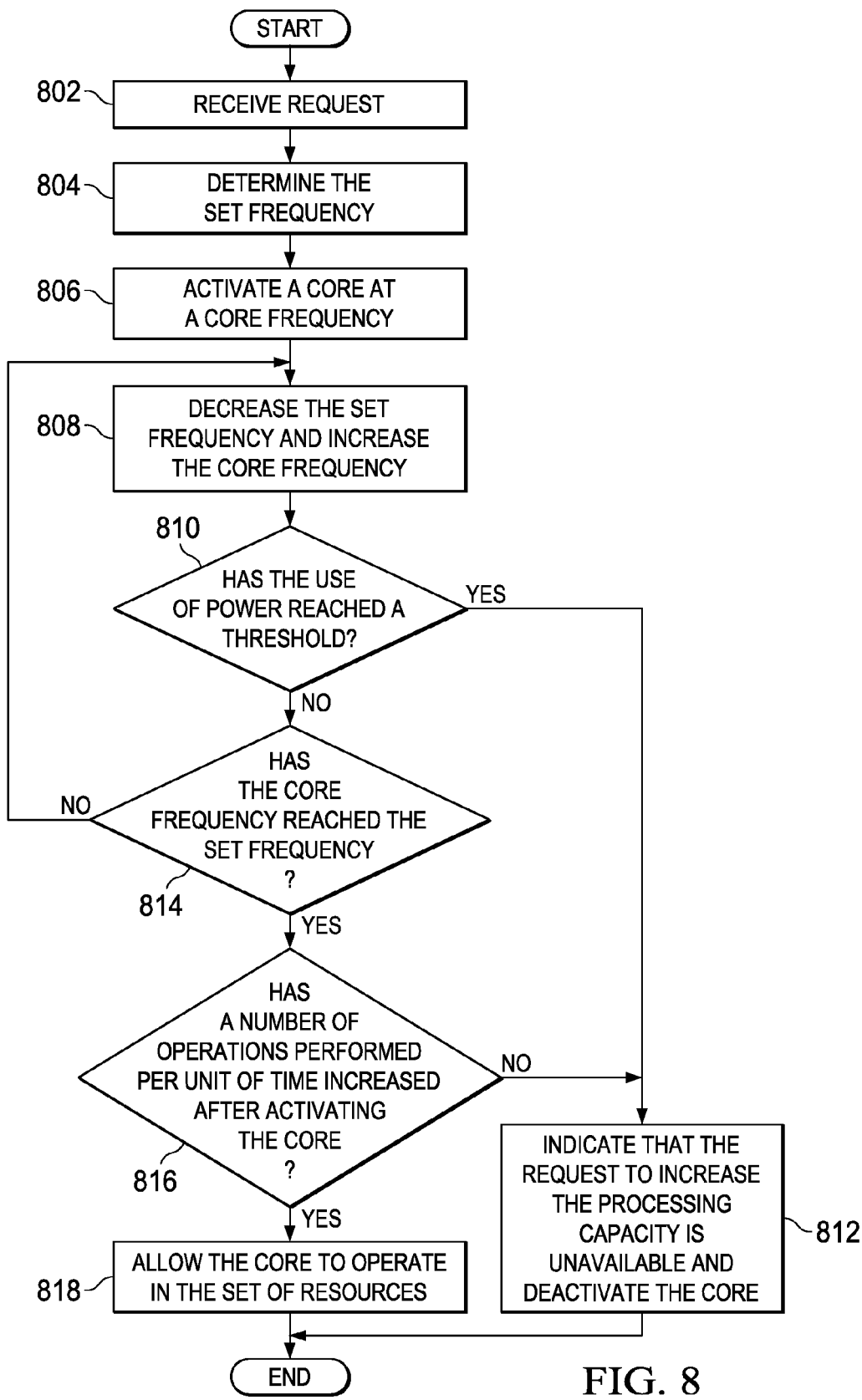
FIG. 8 is a flowchart of a process for adjusting frequencies in a set of resources depicted in accordance with an illustrative embodiment.

With reference now to FIG. 8, a flowchart of a process for adjusting frequencies in a set of resources is depicted in accordance with an illustrative embodiment. The process may be performed by upgrade management process 304 implemented in power management system 302 in FIG. 3.

The process begins by receiving a request to increase a processing capacity of a set of resources (step 802). The process then determines a set frequency of the set of cores in the set of resources (step 804). Thereafter, the process activates a core in the set of resources at a core frequency (step 806). In step 806, the core frequency is less than the set frequency. For example, the core frequency may be a minimum frequency for the core. The process then decreases the set frequency and increases the core frequency (step 808). In step 808, the process may step the set frequency and the core frequency together at predetermined intervals. For example, the process may increase the core frequency as discussed with regard to step 706 in FIG. 7.

Thereafter, the process then determines whether the use of power resulting from operating the core at the core frequency has reached a threshold in a policy for the use of power in the set of resources (step 810). For example, in step 810, the threshold in the policy may be a limit for the core, a board the core is positioned on, the set of resources, or the data processing system. If the process determines that the use of power has reached the threshold, the process indicates that the request to increase the processing capacity is unavailable and deactivates the core (step 812), with the process terminating thereafter.

If the process determines that the use of power has not reached the threshold, the process determines whether a value of the core frequency has reached a value of the set frequency (step 814). In step 814, the core frequency may have passed the set frequency or be within some nominal range of the set frequency. Either occurrence may result in a determination that the core frequency has reached the set frequency. If the process determines that the core frequency has not reached the set frequency, the process returns to step 808 and decreases the set frequency and increases the core frequency.

If the process determines that the core frequency has reached the set frequency, the process determines whether a number of operations performed per unit of time by a set of cores associated with the set of resources increased after activating the core (step 816). If the process determines that the number has not increased after activating the core, the process indicates that the request to increase the processing capacity of the set of resources is unavailable and deactivates the core (step 812), with the process terminating thereafter. If the process determines that the number has increased after activating the core, the process allows the core in the set of resources to operate in the set of resources (step 818), with the process terminating thereafter.

Figure 9:
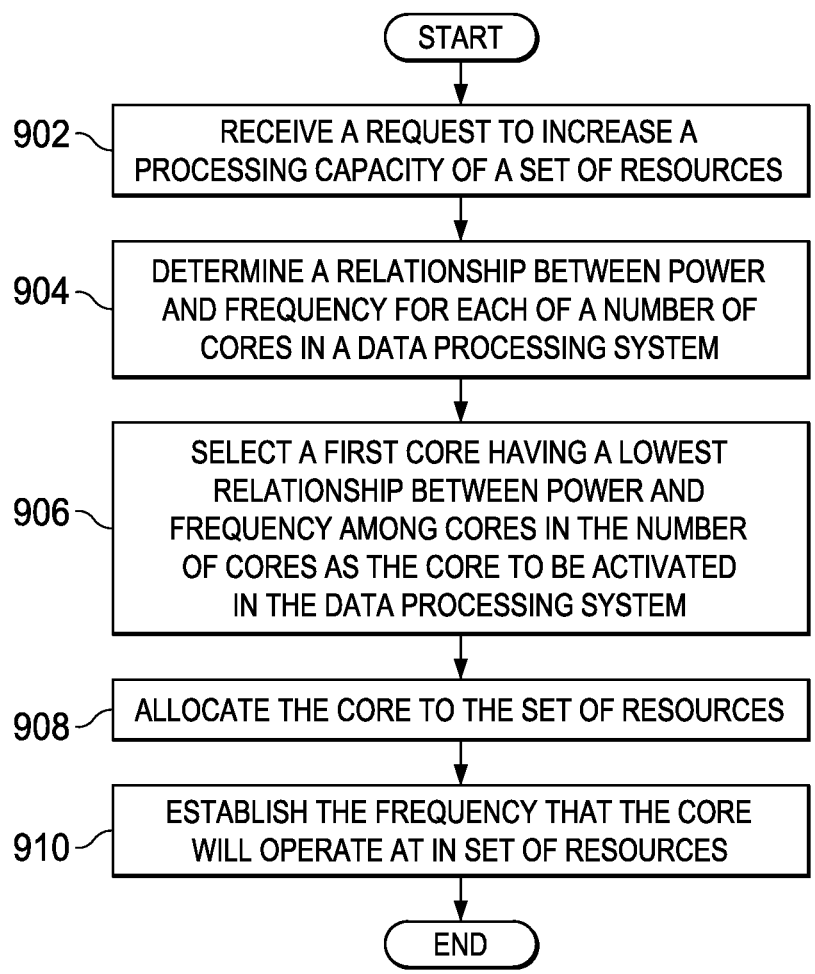
FIG. 9 is a flowchart of a process for selecting a core in a data processing system depicted in accordance with an illustrative embodiment.

With reference now to FIG. 9, a flowchart of a process for selecting a core in a data processing system is depicted in accordance with an illustrative embodiment. The process may be performed by power management process 304 implemented in power management system 302 in FIG. 3.

The process begins by receiving a request to increase a processing capacity of a set of resources (step 902). The process then determines a relationship between power and frequency for each of a number of cores in the data processing system (step 904). In step 904, the number of cores are inactive within the data processing system. The process may determine an equation for the relationship based on a plot of power versus frequency. The process then selects a first core having a lowest relationship between power and frequency among cores in the number of cores as the core to be activated in the data processing system (step 906). In step 906, the core selected may be the core that has the lowest derivative of the equation among the number of cores.

Thereafter, the process allocates the core to the set of resources (step 908). The process then establishes the frequency that the core will operate at in set of resources (step 910), with the process terminating thereafter. For example, in step 908, the frequency may be established as discussed in FIG. 7 and steps 706 through 716. The frequency may also be established as discussed in FIG. 8 and steps 806 through 824.

Figure 10:
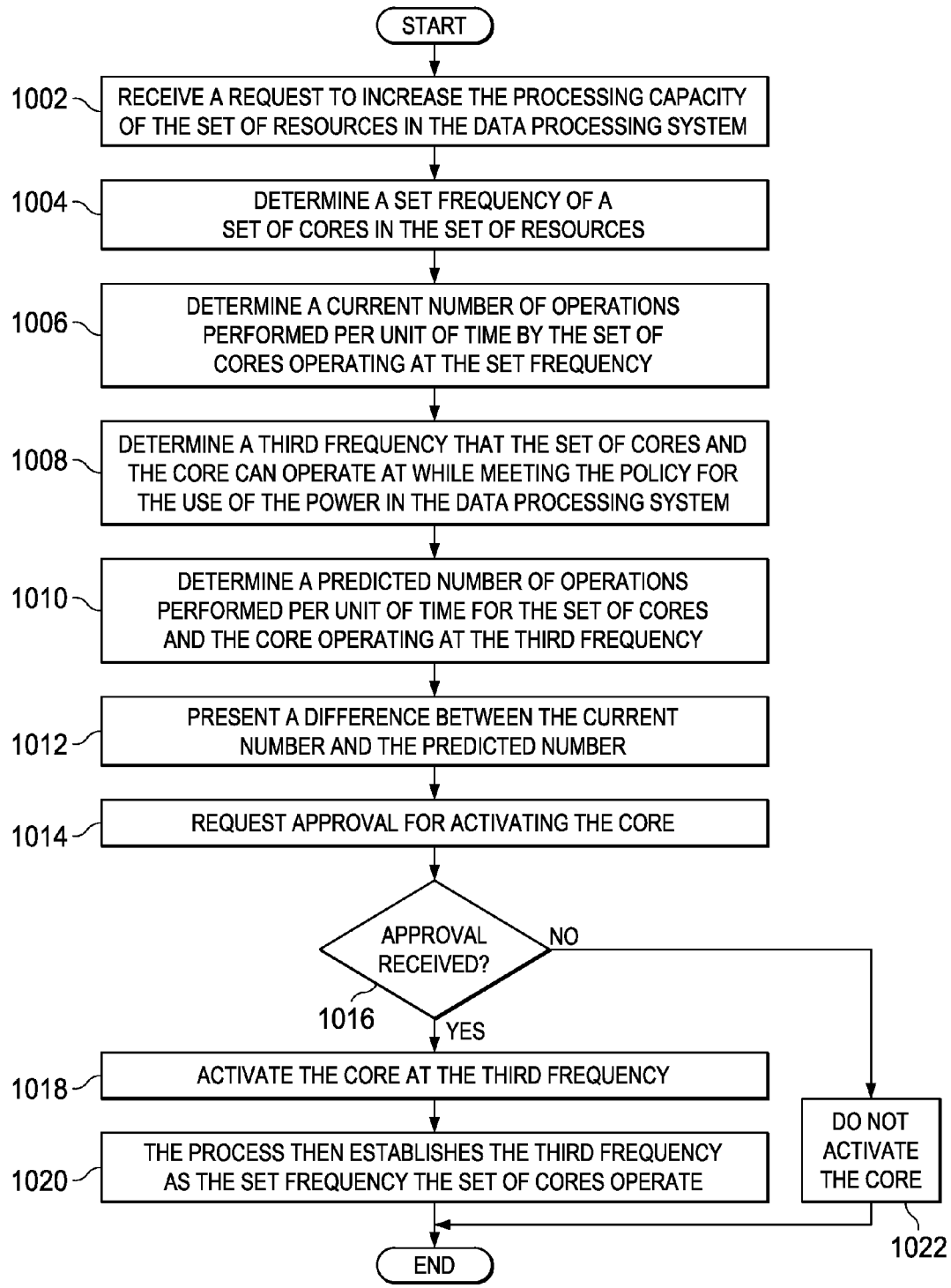
FIG. 10 is a flowchart of a process for determining capacity in a data processing system depicted in accordance with an illustrative embodiment.

With reference now to FIG. 10, a flowchart of a process for determining capacity in a data processing system is depicted in accordance with an illustrative embodiment. The process may be performed by power management process 304 implemented in power management system 302 in FIG. 3.

The process begins by receiving a request to increase the processing capacity of the set of resources in the data processing system (step 1002). The process then determines a set frequency of a set of cores in the set of resources (step 1004). Thereafter, the process determines a current number of operations performed per unit of time by the set of cores operating at the set frequency (step 1006).

The process then determines a third frequency that the set of cores and the core can operate at while meeting the policy for the use of the power in the data processing system (step 1008). In step 1008, the third frequency may have a same value as a value for the set frequency. The value of the third frequency may also be lower than the value for the set frequency. Thereafter, the process determines a predicted number of operations performed per unit of time for the set of cores and the core operating at the third frequency (step 1010).

The process then presents a difference between the current number and the predicted number (step 1012). In step 1012, the difference may be presented to a user that requested the increase in the processing capacity. Thereafter, the process requests approval for activating the core (step 1014). If the process receives the approval (step 1016), the process activates the core at the third frequency (step 1018). The process then establishes the third frequency as the set frequency the set of cores operate (step 1020), with the process terminating thereafter. In step 1020, the third frequency may have a same value as a value for the set frequency. Thus step 1020 may consist of doing nothing. If the process does not receive the approval, the process does not activate the core (step 1022), with the process terminating thereafter.

Figure 11:
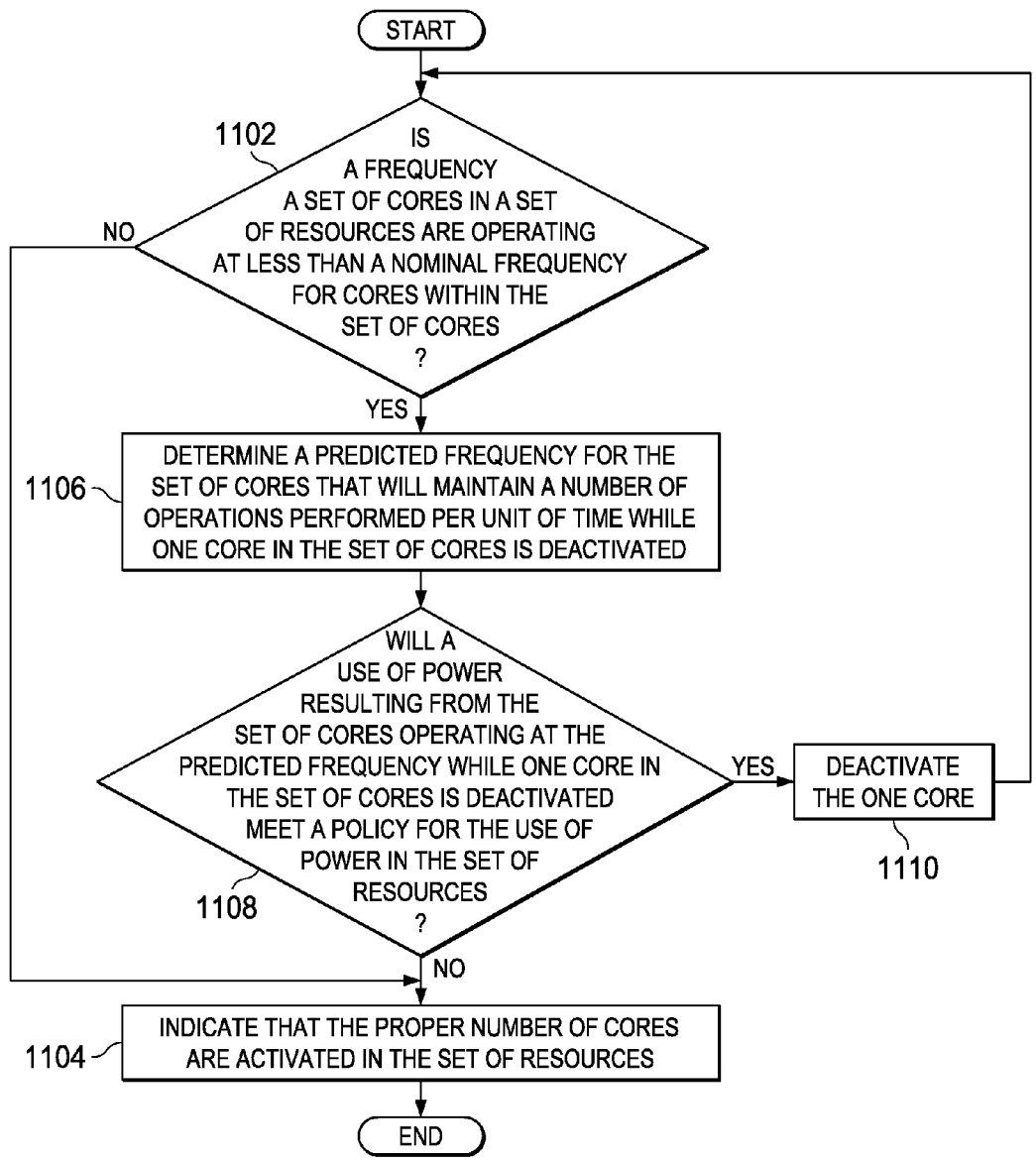
FIG. 11 is a flowchart of a process for managing cores in a set of resources depicted in accordance with an illustrative embodiment.

With reference now to FIG. 11, a flowchart of a process for managing cores in a set of resources is depicted in accordance with an illustrative embodiment. The process may be performed by power management process 304 implemented in power management system 302 in FIG. 3.

The process begins by determining whether a frequency a set of cores in a set of resources are operating at is less than a nominal frequency for cores within the set of cores (step 1102). If the process determines that the frequency is not less than the nominal frequency, the process indicates that the proper number of cores are activated in the set of resources (step 1104), with the process terminating thereafter. If the process determines that that the frequency is less than the nominal frequency, the process determines a predicted frequency for the set of cores that will maintain a number of operations performed per unit of time while one core in the set of cores is deactivated (step 1106).

Thereafter, the process determines whether a use of power resulting from the set of cores operating at the predicted frequency while the one core in the set of cores is deactivated meets a policy for the use of power in the set of resources (step 1108). If the process determines that the use of power does not meet the policy, the process returns to step 1104, with the process terminating thereafter. If the process determines that the use of power does meet the policy, the process deactivates the one core (step 1110). Thereafter, the process returns to step 1102 to determine whether additional cores may be deactivated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the different illustrative embodiments allow for management of power while handling requests for increased capacity in a set of resources. The different illustrative embodiments recognize that power management can determine whether request for increased capacity may be achieved in set of resources. The parameters of devices in the set of resources can be adjusted to meet power use policies for the set of resources. Additionally, the requestor can be provided with information regarding whether the request can be granted and what type of increase may be expected. With this information the requestor can determine whether the expectations are worth the cost of the request.

Additionally, different illustrative embodiments manage requests for increased capacity. The different illustrative embodiments provide several processes to scale parameters of devices in the set of resources to increase capacity while meeting the power use policies in place. The different illustrative embodiments also provide processes for determine a number of resources that should be active within the set of resources to meet capacity expectations. If capacity expectations may be met with fewer resources, resources may be deactivated. Resources being deactivated may save in licensing costs. Resources being deactivate may also result in reductions in use power of power while still meeting capacity expectations.

Thus, the different illustrative embodiments provide a method, computer program product, and apparatus for managing power in a data processing system. In an illustrative embodiment, a core is activated in the data processing system and configured to operate at a frequency in response to receiving a request to increase a processing capacity of a set of resources in the data processing system. A determination whether a use of power resulting from activating the core configured to operate at the frequency meets a policy for the use of the power in the data processing system is made. A set of parameters associated with devices in the set of resources are adjusted to meet the policy for the use of power in the data processing system in response to a determination that the use of power does not meet the policy. A determination whether a number of operations performed per unit of time by a set of cores associated with the set of resources increased after activating the core is made. An indication that the request to increase the processing capacity of the set of resources is unavailable is made in response to a determination that the number of operations performed per unit of time by the set of cores associated with the set of resources has not increased.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, semiconductor system (apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output, or I/O devices (including but not limited to keyboards, displays, pointing devices, etc.), can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing power in a data processing system, the method comprising:
   responsive to receiving a request to increase a processing capacity of a set of resources in the data processing system, activating a core in the data processing system configured to operate at a first frequency, wherein the core is part of the set of resources, and determining a second frequency of a set of cores in the set of resources, wherein the first frequency is less than the second frequency;
   determining whether a use of power resulting from activating the core configured to operate at the first frequency meets a policy for the use of the power in the data processing system by increasing the first frequency of the core until the use of power resulting from operating the core at the first frequency reaches a threshold in the policy for the use of power in the data processing system and a first value of the first frequency reaches a second value of the second frequency of the set of cores; and
   responsive to the use of power resulting from operating the core at the first frequency reaching the threshold before the first value of the first frequency reaches the second value of the second frequency of the set of cores, indicating that the request to increase the processing capacity is unavailable and deactivating the core.

2. The method of claim 1, wherein the core is part of the set of resources, the frequency is a first frequency, and further comprising:
   responsive to receiving the request to increase the processing capacity of the set of resources, determining a second frequency of the set of cores in the set of resources;
   determining whether the use of power resulting from activating the core at the second frequency meets the policy for the use of the power in the data processing system before activating the core; and
   wherein activating the core in the data processing system comprises:
   activating the core in the data processing system at the second frequency in response to a determination that the use of power meets the policy.

3. The method of claim 1, wherein the core is part of the set of resources, the frequency is a first frequency, and further comprising:
   responsive to receiving the request to increase the processing capacity of the set of resources, activating the core in the set of resources at the first frequency;
   determining a second frequency of the set of cores in the set of resources, wherein the first frequency is less than the second frequency; and
   decreasing the second frequency of the set of cores while increasing the first frequency of the core until a first value associated with the first frequency reaches a second value associated with the second frequency.

4. The method of claim 1 further comprising:
   determining a relationship between power and frequency for each of a number of cores in the data processing system, wherein the number of cores are inactive within the data processing system;
   selecting a core having a lowest relationship between power and frequency among cores in the number of cores as the core to be activated in the data processing system; and
   allocating the core to the set of resources.

5. The method of claim 1 further comprising:
   responsive to receiving a request for memory in the set of resources, determining whether the use of power resulting from adding the memory meets the policy for the use of the power in the data processing system; and
   responsive to a determination that the use of power resulting from activating the memory will not meet the policy, adjusting a rate at which data is written to and read from the memory to meet the policy for the use of power in data processing system.

6. The method of claim 1 further comprising:
responsive to receiving a request to add a set of input/output devices to the set of resources, determining whether the use of power resulting from adding the set of input/output devices to the set of resources the policy for the use of the power in the data processing system; and
responsive to a determination that the increase in power caused by adding the set of input/output devices will exceed a power threshold associated with the set of resources, indicating that the request to add the set of input/output devices to the set of resources is unavailable.

7. The method of claim 1, wherein the frequency is a first frequency and further comprising:
responsive to receiving the request to increase the processing capacity of the set of resources in the data processing system, determining a second frequency of the set of cores in the set of resources and a current number of operations performed per unit of time by the set of cores operating at the second frequency;
determining a third frequency that the set of cores and the core can operate at while meeting the policy for the use of the power in the data processing system;
determining a predicted number of operations performed per unit of time for the set of cores and the core operating at the third frequency;
presenting a difference between the current number and the predicted number; and
requesting approval for activating the core before activating the core in the data processing system.

8. The method of claim 1, wherein the frequency is a first frequency, wherein the core is part of the set of cores in the set of resources, wherein the set of cores operate at the first frequency, and further comprising:
determining whether the first frequency of the set of cores is less than a nominal frequency for cores within the set of cores;
responsive to a determination that the first frequency is less than the nominal frequency, determining a second frequency for the set of cores that will maintain the number of operations performed per unit of time while at least one core in the set of cores is deactivated;
responsive to determining the second frequency for the set of cores that will maintain the number of operations performed per unit of time while the at least one core in the set of cores is deactivated, determining whether the use of power resulting from the set of cores operating at the second frequency while the at least one core in the set of cores is deactivated meets the policy for the use of power in the data processing system; and
responsive to a determination that the use of power resulting from the set of cores operating at the second frequency while the at least one core in the set of cores is deactivated meets the policy, deactivating the at least one core.

9. The method of claim 1, wherein the set of resources is a partition within the data processing system and wherein the core is one of a plurality of cores in a processor unit.

10. A computer program product for managing power in a data processing system, the computer program product comprising:
a non-transitory computer readable storage medium;
program code, stored on the computer readable storage medium, for activating a core in the data processing system configured to operate at a first frequency in response to receiving a request to increase a processing capacity of a set of resources in the data processing system, wherein the core is part of the set of resources, and determining a second frequency of a set of cores in the set of resources, wherein the first frequency is less than the second frequency;
program code, stored on the computer readable storage medium, for determining whether a use of power resulting from activating the core configured to operate at the first frequency meets a policy for the use of the power in the data processing system by increasing the first frequency of the core until the use of power resulting from operating the core at the first frequency reaches a threshold in the policy for the use of power in the data processing system and a first value of the first frequency reaches a second value of the second frequency of the set of cores; and
program code, stored on the computer readable storage medium, for indicating that the request to increase the processing capacity is unavailable and deactivating the core in response to the use of power resulting from operating the core at the first frequency reaching the threshold before the first value of the first frequency reaches the second value of the second frequency of the set of cores.

11. The computer program product of claim 10, wherein the core is in the set of resources, the frequency is a first frequency, and further comprising:
program code, stored on the computer readable storage medium, for determining a second frequency of the set of cores in the set of resources in response to receiving the request to increase the processing capacity of the set of resources;
program code, stored on the computer readable storage medium, for determining whether the use of power resulting from activating the core at the second frequency meets the policy for the use of the power in the data processing system before activating the core; and
wherein the program code for activating the core in the data processing system comprises:
program code, stored on the computer readable storage medium, for activating the core in the data processing system at the second frequency in response to a determination that the use of power meets the policy.

12. The computer program product of claim 10, wherein the core is part of the set of resources, the frequency is a first frequency, and further comprising:
program code, stored on the computer readable storage medium, for activating the core in the set of resources at the first frequency in response to receiving the request to increase the processing capacity of the set of resources;
program code, stored on the computer readable storage medium, for determining a second frequency of the set of cores in the set of resources, wherein the first frequency is less than the second frequency; and
program code, stored on the computer readable storage medium, for decreasing the second frequency of the set of cores while increasing the first frequency of the core until a first value associated with the first frequency reaches a second value associated with the second frequency.

13. The computer program product of claim 10 further comprising:
program code, stored on the computer readable storage medium, for determining a relationship between power and frequency for each of a number of cores in the data processing system, wherein the number of cores are inactive within the data processing system;

program code, stored on the computer readable storage medium, for selecting a core having a lowest relationship between power and frequency among cores in the number of cores as the core to be activated in the data processing system; and program code, stored on the computer readable storage medium, for allocating the core to the set of resources.

14. The computer program product of claim 10, wherein the frequency is a first frequency and further comprising:

program code, stored on the computer readable storage medium, for determining a second frequency of the set of cores in the set of resources and a current number of operations performed per unit of time by the set of cores operating at the second frequency in response to receiving the request to increase the processing capacity of the set of resources in the data processing system;

program code, stored on the computer readable storage medium, for determining a third frequency that the set of cores and the core can operate at while meeting the policy for the use of the power in the data processing system;

program code, stored on the computer readable storage medium, for determining a predicted number of operations performed per unit of time for the set of cores and the core operating at the third frequency;

program code, stored on the computer readable storage medium, for presenting a difference between the current number and the predicted number; and program code, stored on the computer readable storage medium, for requesting approval for activating the core before activating the core in the data processing system.

15. The computer program product of claim 10, wherein the frequency is a first frequency, wherein the core is part of the set of cores in the set of resources, wherein the set of cores operate at the first frequency, and further comprising:

program code, stored on the computer readable storage medium, for determining whether the first frequency of the set of cores is less than a nominal frequency for cores within the set of cores;

program code, stored on the computer readable storage medium, for determining a second frequency for the set of cores that will maintain the number of operations performed per unit of time while at least one core in the set of cores is deactivated in response to a determination that the first frequency is less than the nominal frequency;

program code, stored on the computer readable storage medium, for determining whether the use of power resulting from the set of cores operating at the second frequency while the at least one core in the set of cores is deactivated meets the policy for the use of power in the data processing system in response to determining the second frequency for the set of cores that will maintain the number of operations performed per unit of time while the at least one core in the set of cores is deactivated; and program code, stored on the computer readable storage medium, for deactivating the at least one core in response to a determination that the use of power resulting from the set of cores operating at the second frequency while the at least one core in the set of cores is deactivated meets the policy.

16. An apparatus comprising:
a data processing system; and
a power management module in communication with the data processing system and configured to activate a core in the data processing system configured to operate at a first frequency in response to receiving a request to increase a processing capacity of a set of resources in the data processing system, wherein the core is part of the set of resources, and determining a second frequency of a set of cores in the set of resources, wherein the first frequency is less than the second frequency; to determine whether a use of power resulting from activating the core configured to operate at the first frequency meets a policy for the use of the power in the data processing system by increasing the first frequency of the core until the use of power resulting from operating the core at the first frequency reaches a threshold in the policy for the use of power in the data processing system and a first value of the first frequency reaches a second value of the second frequency of the set of cores; and to indicate that the request to increase the processing capacity is unavailable and deactivating the core in response to the use of power resulting from operating the core at the first frequency reaching the threshold before the first value of the first frequency reaches the second value of the second frequency of the set of cores.

17. The apparatus of claim 16, wherein the core is part of the set of resources, the frequency is a first frequency, and wherein the power management module is further configured to determine a second frequency of the set of cores in the set of resources in response to receiving the request to increase the processing capacity of the set of resources, determine whether the use of power resulting from activating the core at the second frequency meets the policy for the use of the power in the data processing system before activating the core, and wherein in activating the core in the data processing system the power management module is further configured to activate the core in the data processing system at the second frequency in response to a determination that the use of power meets the policy.

18. The apparatus of claim 16, wherein the core is part of the set of resources, the frequency is a first frequency, and wherein the power management module is further configured to activate the core in the set of resources at the first frequency in response to receiving the request to increase the processing capacity of the set of resources, determine a second frequency of the set of cores in the set of resources, wherein the first frequency is less than the second frequency, and decrease the second frequency of the set of cores while increasing the first frequency of the core until a first value associated with the first frequency reaches a second value associated with the second frequency.

19. The apparatus of claim 16, wherein the power management module is further configured to determine a relationship between power and frequency for each of a number of cores in the data processing system, wherein the number of cores are inactive within the data processing system, select a core having a lowest relationship between power and frequency among cores in the number of cores as the core to be activated in the data processing system, and allocate the core to the set of resources.

20. An apparatus comprising:
a controller configured to activate a core in a data processing system configured to operate at a first frequency in response to receiving a request to increase a processing capacity of the set of resources in the data processing system, wherein the core is part of the set of resources, and determining a second frequency of a set of cores in the set of resources, wherein the first frequency is less than the second frequency;

an power management system configured to determine whether a use of power resulting from activating the core configured at the first frequency meets a policy for the use of the power in the data processing system by increasing the first frequency of the core until the use of power resulting from operating the core at the first frequency reaches a threshold in the policy for the use of power in the data processing system and a first value of the first frequency reaches a second value of the second frequency of the set of cores and configured to deactivate the core in response to the use of power resulting from operating the core at the first frequency reaching the threshold before the first value of the first frequency reaches the second value of the second frequency of the set of cores; and a user interface configured to indicate that the request to increase the processing capacity of the set of resources is unavailable in response to the use of power resulting from operating the core at the first frequency reaching the threshold before the first value of the first frequency reaches the second value of the second frequency of the set of cores.

21. The apparatus of claim 20, wherein the core is part of the set of resources and the frequency is a first frequency, wherein the upgrade management system is configured to determine a second frequency of the set of cores in the set of resources in response to receiving the request to increase the processing capacity of the set of resources, wherein the power management system is configured to determine whether the use of power resulting from activating the core at the second frequency meets the policy for the use of the power in the data processing system before activating the core, and wherein the controller is configured to activate the core in the data processing system at the second frequency in response to a determination that the use of power meets the policy.

22. The method of claim 1 further comprising:
responsive to a determination that the use of power does not meet the policy, adjusting a set of parameters associated with devices in the set of resources to meet the policy for the use of power in the data processing system;
determining whether a number of operations performed per unit of time by the set of cores associated with the set of resources increased after activating the core; and
responsive to a determination that the number of operations performed per unit of time by the set of cores associated with the set of resources has not increased, indicating that the request to increase the processing capacity of the set of resources is unavailable.

23. The computer program product of claim 10 further comprising:

program code, stored on the computer readable storage medium, for adjusting a set of parameters associated with devices in the set of resources to meet the policy for the use of power in the data processing system in response to a determination that the use of power does not meet the policy;

program code, stored on the computer readable storage medium, for determining whether a number of operations performed per unit of time by a set of cores associated with the set of resources increased after activating the core; and program code, stored on the computer readable storage medium, for indicating that the request to increase the processing capacity of the set of resources is unavailable in response to a determination that the number of operations performed per unit of time by the set of cores associated with the set of resources has not increased.

24. The apparatus of claim 16, wherein the power management module is further configured: to adjust a set of parameters associated with devices in the set of resources to meet the policy for the use of power in the data processing system in response to a determination that the use of power does not meet the policy; to determine whether a number of operations performed per unit of time by a set of cores associated with the set of resources increased after activating the core; and to indicate that the request to increase the processing capacity of the set of resources is unavailable in response to a determination that the number of operations performed per unit of time by the set of cores associated with the set of resources has not increased.

25. The apparatus of claim 20 further comprising:
the power management system further configured to adjust a set of parameters associated with devices in the set of resources to meet the policy for the use of power in the data processing system in response to a determination that the use of power does not meet the policy;
an upgrade management system configured to determine whether a number of operations performed per unit of time by a set of cores associated with the set of resources increased; and
the user interface further configured to indicate that the request to increase the processing capacity of the set of resources is unavailable in response to a determination that the number of operations performed per unit of time by the set of cores associated with the set of resources has not increased.

* * * * *